(12) United States Patent
Manthina

(10) Patent No.: US 10,339,564 B2
(45) Date of Patent: Jul. 2, 2019

(54) SYSTEM AND METHOD FOR PROVIDING AN ADAPTIVELY ORDERED PRESENTATION OF OBJECTS

(71) Applicant: ORACLE INTERNATIONAL CORPORATION, Redwood Shores, CA (US)

(72) Inventor: Ashok Manthina, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 366 days.

(21) Appl. No.: 15/044,389

(22) Filed: Feb. 16, 2016

(65) Prior Publication Data

US 2017/0236155 A1   Aug. 17, 2017

(51) Int. Cl.
*G06Q 30/02* (2012.01)
*H04L 29/08* (2006.01)
(Continued)

(52) U.S. Cl.
CPC ... *G06Q 30/0255* (2013.01); *G06F 16/24573* (2019.01); *G06F 16/24578* (2019.01);
(Continued)

(58) Field of Classification Search
CPC ............ G06Q 30/0631; G06Q 30/0641; G06F 17/3053; G06F 17/30525; G06F 17/3086; H04L 67/22; H04L 67/02; H04L 67/10
See application file for complete search history.

(56) References Cited

U.S. PATENT DOCUMENTS

| 6,963,867 B2 * | 11/2005 | Ford | ................. G06F 17/30705 707/752 |
| 7,043,546 B2 | 5/2006 | Smith et al. | |

(Continued)

FOREIGN PATENT DOCUMENTS

WO    WO 2000/73964 A2 *  6/2000   ............. G06F 17/60

OTHER PUBLICATIONS

Ding et al. Time Weight Collaborative Filtering. CIKM'05, Oct. 31-Nov. 5, 2005, Bremen, Germany. Copyright 2005 ACM 1595931406/05/0010. pp. 485-492. (Year: 2005).*

*Primary Examiner* — Amy M Levy
(74) *Attorney, Agent, or Firm* — Kraguljac Law Group, LLC

(57) ABSTRACT

Computerized embodiments are disclosed for presenting object representations to a user in an ordered manner based on object popularity. In one embodiment, a web server computer is configured to capture transactional data that represents events caused by interactions of users with a website. A transactional database computer is configured to store the user transactional data. An analytics database computer is configured to extract the transactional data from the transactional database computer, transform the transactional data into object popularity data having object popularity scores, and load the object popularity data into the transactional database computer. The transactional database computer is further configured to sort objects based on the object popularity scores, forming sorted object data. The web server computer is further configured to generate an ordered object presentation that provides computerized representations of the objects that are arranged based on the sorted object data.

18 Claims, 7 Drawing Sheets

(51) Int. Cl.
*G06F 16/2457* (2019.01)
*G06F 16/9535* (2019.01)

(52) U.S. Cl.
CPC ......... *G06F 16/9535* (2019.01); *H04L 67/02* (2013.01); *H04L 67/22* (2013.01)

(56) References Cited

U.S. PATENT DOCUMENTS

| | | | | | |
|---|---|---|---|---|---|
| 7,406,436 | B1* | 7/2008 | Reisman | ................ | G06Q 30/02 |
| | | | | | 705/7.32 |
| 7,970,857 | B2 | 6/2011 | Schneider | | |
| 8,843,477 | B1 | 9/2014 | Tirumalareddy et al. | | |
| 8,924,379 | B1* | 12/2014 | Kim | ................ | G06F 17/30657 |
| | | | | | 707/725 |
| 9,454,582 | B1 | 9/2016 | Tirumalareddy et al. | | |
| 9,483,528 | B1 | 11/2016 | Gilbert et al. | | |
| 2003/0135477 | A1* | 7/2003 | Elsey | ................ | G06F 17/30876 |
| 2004/0249650 | A1* | 12/2004 | Freedman | ................ | G06Q 30/02 |
| | | | | | 705/7.29 |
| 2004/0267604 | A1* | 12/2004 | Gross | ................ | G06Q 30/02 |
| | | | | | 705/7.29 |
| 2008/0221987 | A1* | 9/2008 | Sundaresan | ................ | G06Q 30/02 |
| | | | | | 705/14.54 |
| 2009/0164450 | A1* | 6/2009 | Martinez | ................ | G06F 17/30864 |
| 2009/0177644 | A1* | 7/2009 | Martinez | ................ | G06Q 30/02 |
| 2009/0271368 | A1* | 10/2009 | Channell | ................ | G06F 17/30864 |
| 2009/0281870 | A1* | 11/2009 | Sun | ................ | G06Q 10/10 |
| | | | | | 705/7.29 |
| 2009/0319518 | A1* | 12/2009 | Koudas | ................ | G06F 17/30696 |
| 2011/0173212 | A1* | 7/2011 | Tuttle | ................ | G06F 17/30696 |
| | | | | | 707/752 |
| 2012/0159558 | A1* | 6/2012 | Whyte | ................ | H04N 21/222 |
| | | | | | 725/95 |
| 2012/0221442 | A1* | 8/2012 | Olejniczak | ................ | G06F 17/30864 |
| | | | | | 705/27.1 |
| 2012/0265756 | A1* | 10/2012 | Ryan | ................ | G06F 17/30864 |
| | | | | | 707/725 |
| 2013/0067364 | A1* | 3/2013 | Berntson | ................ | G06F 3/048 |
| | | | | | 715/764 |
| 2013/0144750 | A1* | 6/2013 | Brown | ................ | G06Q 30/0631 |
| | | | | | 705/26.7 |
| 2013/0268392 | A1* | 10/2013 | Chateau-Artaud | ................ | G06Q 30/0601 |
| | | | | | 705/26.7 |
| 2014/0019221 | A1* | 1/2014 | Robinson | ................ | G06Q 30/0217 |
| | | | | | 705/14.19 |
| 2014/0180826 | A1* | 6/2014 | Boal | ................ | G06Q 30/0245 |
| | | | | | 705/14.66 |
| 2014/0379524 | A1* | 12/2014 | Grimaud | ................ | G06Q 30/0613 |
| | | | | | 705/26.41 |
| 2015/0095841 | A1* | 4/2015 | Fiedler | ................ | G06F 17/30539 |
| | | | | | 715/781 |
| 2015/0195624 | A1* | 7/2015 | Gossweiler, III | ................ | H04N 21/4826 |
| | | | | | 725/40 |
| 2015/0213538 | A1* | 7/2015 | Zhang | ................ | G06Q 30/0269 |
| | | | | | 705/26.62 |

* cited by examiner

310

| ID | Value |
|---|---|
| 1 | iPhone3 |
| 2 | iPhone4 |
| 3 | iPhone5 |

Product (Candidate Object) and Its Instances

320

| SRId | Product | Description |
|---|---|---|
| SR100 | 1 | Issue with iPhone3 |
| SR101 | 3 | Issue with iPhone5 |
| SR102 | 2 | Problem with iPhone4 |

Service Request (Business Object) and Its Instances

330

| SearchId | Product | Search term |
|---|---|---|
| Search100 | 1 | How do I reset password on iPhone3? |
| Search101 | 3 | How do I install apps on iphone5? |
| | | |

Knowledge Search (Business Object) and Its Instances

FIG. 3

SYSTEM AND METHOD FOR PROVIDING AN ADAPTIVELY ORDERED PRESENTATION OF OBJECTS

BACKGROUND

Information is often presented to a user on a display device of a computer as a list of items or values. The list of items may originate at a web site of a business that is being visited by a user. The list may be in the form of a drop-down list, a choice list, or an option list, for example. The list is often alphabetically ordered, or ordered according to some statically perceived level of importance by the business. When the number of items in the list becomes large, users can spend a lot of time looking through the list to find a particular item of interest. This can have a negative impact on user experience, especially when using small form-factor user devices such as tablet computers and mobile computer devices.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 3 illustrates instances of objects, service requests, and knowledge searches to support an example of ordering the objects according to a popularity of the objects as determined by the system of FIG. 1 when implementing the method of FIG. 2, where the popularity of the objects is determined based on the service requests and the knowledge searches;

DETAILED DESCRIPTION

Figure 1:
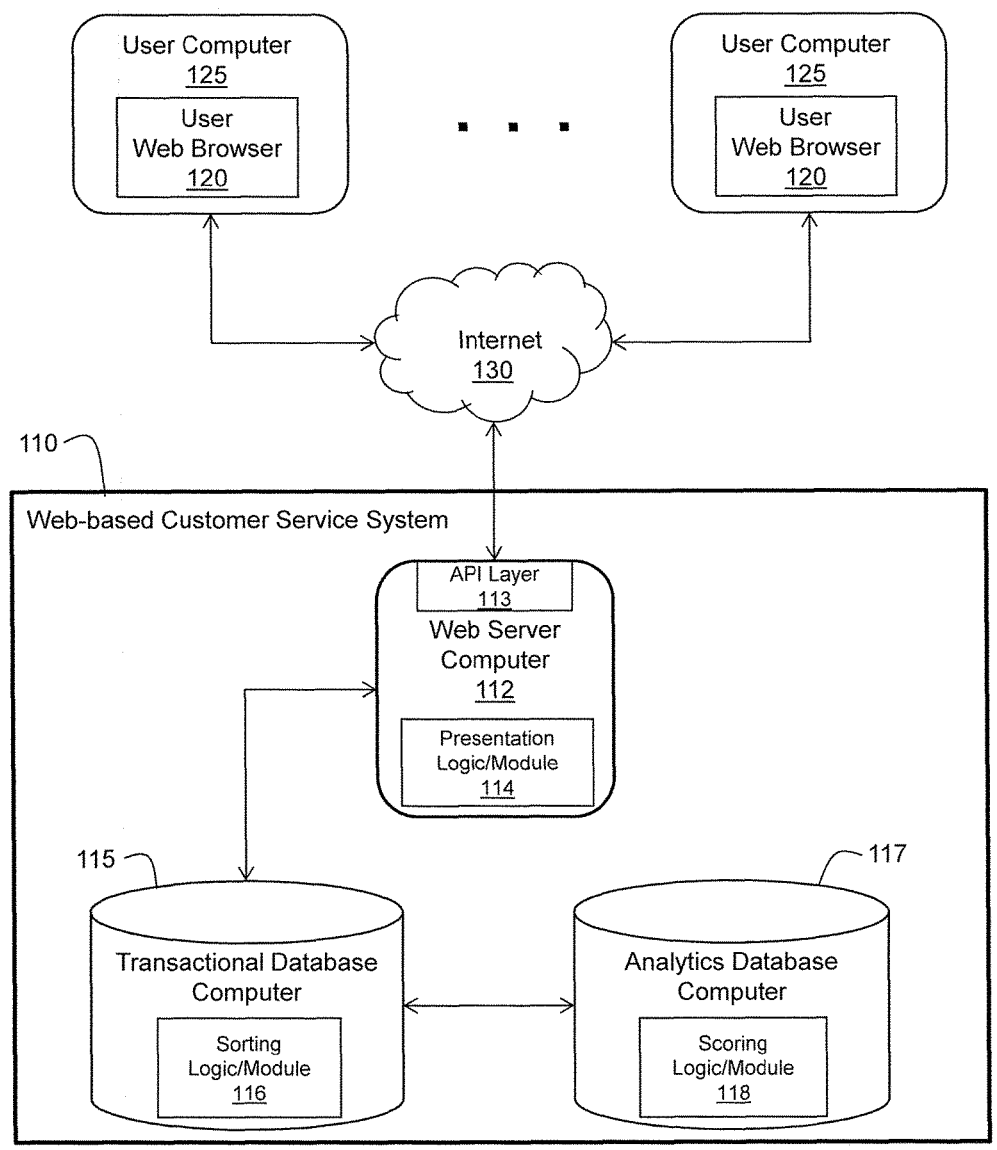
FIG. 1 illustrates one embodiment of a computerized web-based customer service system for providing information about objects, in an adaptively ordered manner, to users who access the computerized web-based customer service system via a web browser over the internet.

Systems, methods, and other embodiments are disclosed that provide object (e.g., product) information to a user, where the object information is adaptively organized as an ordered object presentation. The ordered object presentation is organized based on transactional data. The transactional data represents objects (e.g., products) and associated events caused by interactions of users, via multiple user web browsers, with a website representing multiple objects (e.g., products). As the set of transactional data changes, the ordered object presentation is automatically updated to reflect the changes, based on an importance of the transactional data to the business.

In one embodiment, transactional data is captured and transformed into object popularity data that includes object identifying data and associated object popularity scores. The object popularity scores represent a popularity of the objects (e.g., products) based on characteristics of the transactional data. The object identifying data of the objects is sorted based on the associated object popularity scores to form sorted object data. An ordered object presentation is generated based on the sorted object data. The ordered object presentation includes a data structure in the form of, for example, a list or a web page providing computerized representations of the objects (e.g. products) arranged based on the sorted object data. The ordered object presentation can be transmitted to a user web browser in response to an application interface call from the user web browser.

The following terms are used herein with respect to various embodiments.

The term "object", as used herein, can refer to many different types of things including, for example, products, services, countries, or planets. Even though the term "object" can represent many different types of things, much of the description and associated examples herein are written from the point of view of objects that represent products (e.g., items for sale). However, the claims herein are not limited in any way to products, as the broader term "object" is used in the claims.

The term "computerized web-based customer service system", as used herein, refers to a system in the form of one or more computers that provide services associated with objects (e.g., products) to users via a website which is accessible over the internet. The computers of the computerized web-based customer service system may include, for example, a web server computer and one or more database computers.

The term "transactional data", as used herein, refers to computerized data that represents objects (e.g., products) and associated events caused by interactions of users, via user web browsers, with a website representing multiple objects (e.g., products). The events may include, for example, service requests, knowledge searches, article accesses, or purchases associated with the objects (e.g., products).

The term "application interface call", as used herein, refers to a computerized message from a user web browser to a web server computer to access a website over the internet, where the computerized message is processed through an application program interface (API) layer of the web server computer. The API layer allows the web server computer to communicate with different types of user web browsers.

FIG. 1 illustrates one embodiment of a computerized web-based customer service system 110 for providing information about objects (e.g., products), in an adaptively ordered manner, to users who access the computerized web-based customer service system 110 via user web browsers 120 over the internet 130. The user web browsers 120 run on user computers 125 which are separate from the system 110. In one embodiment, the system 110 is a computing/data processing system including an application or collection of distributed applications for enterprise organizations. The applications and computing system 110 may be configured to operate with or be implemented as a cloud-based networking system, a software-as-a-service (SaaS) architecture, or other type of computing solution.

With reference to FIG. 1, the system 110 is implemented on computers having logics or modules for implementing various functional aspects of the system 110. In one embodiment, the system 110 includes a web server computer 112 providing an application program interface (API) layer 113 and having presentation logic/module 114. The system 110 also includes a transactional database computer 115 having sorting logic/module 116 and an analytics database computer 117 having scoring logic/module 118. Details of these computers and logics/modules are discussed later herein.

Other embodiments may provide different computers and logics or combinations of computers and logics that provide the same or similar functionality as the system 110 of FIG. 1. In one embodiment, the logics of FIG. 1 form an executable application including algorithms and/or program modules configured to perform the functions of the logics. The application is stored in a non-transitory computer storage medium. That is, in one embodiment, the various logics of the system 110 are implemented as modules of instructions stored on a computer-readable medium.

In one embodiment, the system 110 functions as a centralized server-side application of a business enterprise that provides at least the functions disclosed herein, and that receives information over a computer network from other systems. For example, the system 110 can receive information related to objects, types of transactions or events associated with the objects, and system configuration settings, via network communications from other systems of the enterprise. Such information can be processed and stored by the web server computer 112, the transactional database computer 115, and the analytics database computer 117.

Referring again to FIG. 1, in one embodiment, the web server computer 112 is configured to capture transactional data via the application program interface layer 113. The transactional data represents objects and associated events caused by interactions of users, via the user web browsers 120, with a website provided by the web server computer 112. The website represents objects of a business in the form of, for example, lists or web pages. The events can include service requests, knowledge searches, article accesses, and purchases associated with the objects, in accordance with one embodiment.

A service request can be initiated by a user via the website when the user is having a problem with an object (e.g., a product). A knowledge search can be performed by a user via the website to, for example, investigate details of an object. A user can access an article via the website which discusses an object (e.g., an independent review of the object). A user can also purchase an object via the website.

Such service requests, knowledge searches, article accesses, and purchases each generate transactional data which can be captured by the web server computer 112. In accordance with one embodiment, the importance of an object to a business can be characterized, for example, based on the number of service requests, knowledge searches, article accesses, and purchases associated with the object as represented by the transactional data. For example, in one embodiment, it may be assumed that the popularity of an object is based on the number of service requests (tickets) logged, and the number of object searches performed by users. That is, the higher the number of service requests created, the more popular the object is considered to be. Also, the higher the number of object searches performed, the more popular the object is considered to be. The transactional database computer 115 is configured to receive transactional data from the web server computer 112 and record and store the transactional data, in accordance with one embodiment.

In one embodiment, the analytics database computer 117 is configured to perform an extract, transform, and load (ETL) computer process. That is, the analytics database computer 117 is configured to extract the transactional data from the transactional database computer 115, transform the transactional data into object popularity data, and load the object popularity data into the transactional database computer 115. The object popularity data includes object identifying data and associated object popularity scores. The object popularity scores represent a popularity of the objects based on characteristics of the transactional data.

In one embodiment, the analytics database computer 117 is configured to extract the transactional data from the transactional database computer 115 at a scheduled time. For example, the transactional data may be extracted once a month at the beginning of every month. As another example, the transactional data may be extracted every twenty-four (24) hours (e.g., at midnight every night).

In one embodiment, the object popularity data is generated by scoring logic 118 of the analytics database computer 117. Scoring logic 118 is in the form of a module, in one embodiment, stored in a memory including instructions that when executed cause a processor of the analytics database computer 117 to transform the transactional data into the object popularity data. Details of generating the object popularity scores of the object popularity data are discussed later herein.

The transactional database computer 115 is also configured to sort the object identifying data of the objects based on the associated object popularity scores to form sorted object data, and send the sorted object data to the web server computer 112. In one embodiment, the sorted object data is formed by sorting logic 116 of the transactional database computer 115. Sorting logic 116 is in the form of a module, in one embodiment, stored in a memory including instructions that when executed cause a processor of the transactional database computer 115 to sort the object identifying data of the objects based on the associated object popularity scores.

In one embodiment, sorting logic/module 116 ranks the objects (as identified by the object identifying data) in numerical order, from highest object popularity score to lowest object popularity score. The object associated with the highest object popularity score may be given a ranking value of one (1). The other objects may be given ranking values of two (2), three (3), four (4), etc., in accordance with their object popularity scores. In this way, sorted object data (including object identification data and associated ranking values) may be formed.

In one embodiment, the web server computer 112 is also configured to generate an ordered object presentation (e.g., an ordered product presentation) based on the sorted object data. The ordered object presentation includes a data structure in the form of a list or a web page, for example, providing computerized representations of the objects that are arranged based on the sorted object data. For example, the sorted object data may include ten (10) objects having ranking values of one (1) to ten (10) as a result of the sorting process. In one embodiment, the ordered object presentation is formed by presentation logic 114 of the web server computer 112. Presentation logic 114 is in the form of a module, in one embodiment, stored in a memory including instructions that when executed cause a processor of the web server computer 112 to process the sorted object data to generate the ordered object presentation.

For example, in one embodiment, the ordered object presentation may be a list (in the form of a data structure) having the object names (derived from the object identification data) arranged vertically in ranked order from the top of the list to the bottom of the list. In another embodiment, the ordered object presentation may be a web page (in the form of a data structure) having pictures of the objects (derived from the object identification data) arranged in ranked order from the left side of the web page to the right side of the web page. Other arrangements are possible as well, in accordance with other embodiments. As an alternative or in addition, the resultant displayed size of names and/or pictures of objects defined in an ordered object presentation may be relatively larger or smaller depending on ranking.

In accordance with one embodiment, communication between the web server computer 112, the transactional database computer 115, and the analytics database computer 117 occurs over a local area network (LAN) of the system 110. Other means of communication between the computers 112, 115, and 117 are possible as well, in accordance with other embodiments.

In one embodiment, the web server computer 112 is also configured to receive an application interface call from a user web browser 120 over the internet 130 via the API layer 113 of the web server computer 112. A purpose of the application interface call may be to access the website provided by the web server computer 112. The web server computer 112 is further configured to transmit the ordered object presentation to the user web browser 120 over the internet 130 via the API layer 113 in response to the application interface call. The API layer 113 is configured to accommodate different types of user web browsers by properly interpreting an application interface call from any particular type of user web browser, and by transmitting an ordered object presentation in a form that is compatible with the particular type of user web browser.

In this manner, the system 110 allows for the adaptive generating and updating of an ordered object presentation based on changing transactional data produced in response to user interactions with a web site of the system 110 via user web browsers 120. The user interactions produce transactional data representing objects and events such as, for example, service requests, knowledge searches, article accesses, and purchases associated with the objects. The transactional data is transformed (processed and analyzed) to produce an ordered object presentation that facilitates the displaying of representations of objects to users, where the objects are presented in accordance with a popularity of the objects. The popularity of the objects correlates to an importance of the objects to the business enterprise.

Figure 2:
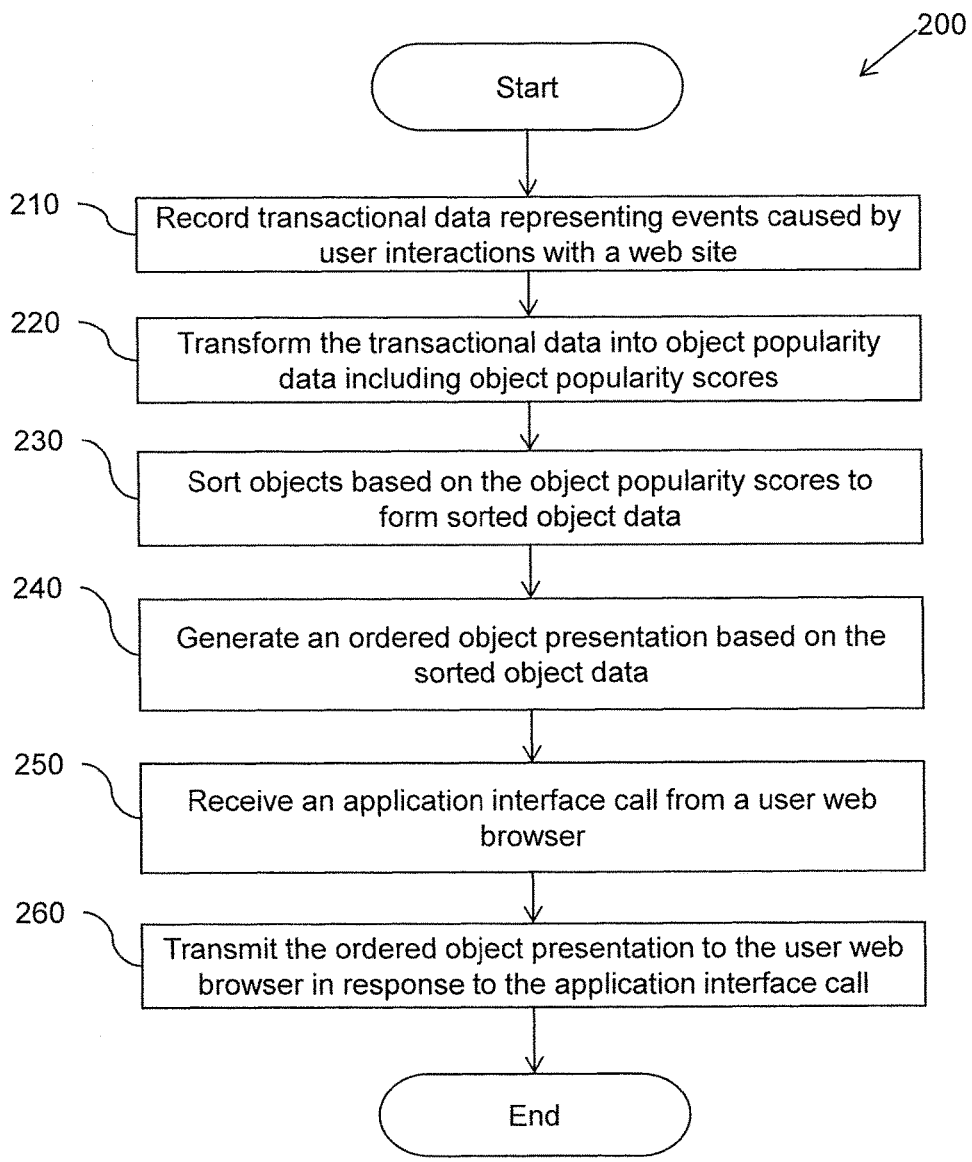
FIG. 2 illustrates one embodiment of a method which can be performed by the computerized web-based customer service system of FIG. 1 to adaptively provide information about objects to users in the form of an ordered object presentation.

FIG. 2 illustrates one embodiment of a method 200 which can be performed by the computerized web-based customer service system 110 of FIG. 1 to adaptively provide information about objects to users in the form of an ordered object presentation (e.g., an ordered product presentation). Method 200 describes operations of system 110 and is implemented to be performed by system 110 of FIG. 1, or by a computing system configured with an algorithm of the method 200. For example, in one embodiment, method 200 is implemented by a computing system configured to execute a computer application. The computer application is configured to process data in electronic form and includes stored executable instructions that perform the functions of method 200.

Method 200 will be described from the perspective that user interactions with a website can be very indicative of the popularity among users of items, supported by the website and, therefore, can also be indicative of the importance of the items to a business enterprise. Method 200 will also be described from the perspective that the method 200 is performed by a computerized web-based customer service system of a business enterprise. The computerized web-based customer service system provides a website that allows users (customers) to at least submit service requests, perform searches, access articles, and make purchases with respect to objects (e.g., products or items) provided by the business enterprise.

Upon initiating method 200, at block 210, transactional data is recorded. The transactional data represents objects and associated events caused by interactions of users, via user web browsers, with a website representing the objects of a business enterprise. In one embodiment, the transactional data is recorded by the transactional database computer 115 of FIG. 1 over a selected period of time (e.g., a day or a month) before being transformed at block 220. Again, the events may include, for example, service requests, searches, article accesses, and purchases associated with the objects presented by the website.

At block 220, the transactional data is transformed into object popularity data that includes object identifying data (e.g., an object number or name) and associated object popularity scores (e.g., numerical values represented as computerized data). Each object popularity score represents a popularity of one of the objects based on characteristics (e.g., event types and a number of each event type occurring over a selected period of time) of the transactional data associated with the object. Details of transforming transactional data into object popularity scores are described later herein. In one embodiment, the transactional data is transformed by scoring logic 118 of the analytics database computer 117 of FIG. 1. The transactional data may be transformed at a scheduled time, in accordance with one embodiment. For example, the transactional data may be transformed once every day at a particular time, accounting for the most-recently recorded transactional data.

At block 230, the object identifying data of the objects is sorted based on the associated object popularity scores to form sorted object data. For example, objects may be sorted from largest object popularity score to smallest object popularity score. The resultant sorted object data may include the object identifying data (e.g., object numbers or object names) and associated ranking values (e.g., 1, 2, 3, etc.). In one embodiment, the sorting is performed by sorting logic 116 of the transactional database computer 115 of FIG. 1.

At block 240, an ordered object presentation (e.g., a list data structure or a web page data structure) is generated based on the sorted object data. The ordered object presentation provides computerized representations (e.g., text, pictures, icons, and/or links) of the objects that are arranged based on the sorted object data (i.e., arranged based on importance to the business enterprise). In one embodiment, the ordered object presentation is generated by presentation logic 114 of the web server computer 112 of FIG. 1.

At block 250, an application interface call is received from a user web browser 120 to access a website and, at block 260, the ordered object presentation is transmitted to the user web browser 120 in response to the application interface call. In one embodiment, the application interface call is received by the API layer 113 of the web server computer 112 of FIG. 1. Also, in one embodiment, the ordered object presentation is transmitted to the user web browser 120 by the API layer 113 of the web server computer 112 of FIG. 1. The ordered object presentation, upon being received by the user web browser 120, may be displayed (e.g., as a list and/or a web page) on a display device of the user computer 125 as facilitated by the user web browser 120.

The ordered object presentation can be periodically updated by repeating the blocks 210-240 of recording, transforming, sorting, and generating as new or updated transactional data becomes available. For example, the ordered object presentation may be updated once a day or once a month. The updated transactional data includes representations of additional events, associated with objects, caused by additional interactions of users, via the user web browsers, with the website.

In this manner, an ordered object presentation, in the form of a list or a web page provided by a website, can be adaptively generated and updated as transactional data, produced in response to user interactions with the website, indicate changes in the popularity of objects associated with the website. Representations of the objects can be adaptively arranged and presented in the ordered object presentation such that the more popular objects appear closer to the top of the list or more prominently on the web page, for example.

Details and Examples of Calculating an Object (e.g., Product) Popularity Score

As used in this section, the term "candidate object" refers to a product and the term "business object" refers to a type of event or transaction associated with a product. Candidate objects (products) and business objects (events) may be represented by transactional data, in accordance with one embodiment. Again, types of events (business objects) may include service requests, knowledge searches, article accesses, and purchases, for example, associated with products.

A product popularity score ($p_{score}$) for a candidate object (a product) may be calculated based on transactional data representing business objects (BO1, BO2, BO3, . . . BOn) as follows:

$$p_{score} = \sum_{i=1}^{12} \frac{c1 * N_{iBO1}}{(1+r)^{(i-1)}} + \sum_{i=1}^{12} \frac{c2 * N_{iBO2}}{(1+r)^{(i-1)}} + \ldots$$

where, $N_{i\ BO1}$=Bayesian average of Business Object 1 (BO1) (e.g., service requests) for the given candidate object (product) for the $i^{th}$ month. See the Bayesian monthly calculation section.

$N_{i\ BO2}$=Bayesian average of Business Object 2 (BO2) (e.g., knowledge searches) for the given candidate object (product) for the $i^{th}$ month.

c1=Constant to indicate the popularity of business object (BO1) compared to others such as BO2 etc. Initial value=0.6, for example.

c2=Constant to indicate the popularity of BO2 object compared to others such as BO1 etc. Initial value=0.4, for example.

(Note: c1+c2 . . . cn=1) This equation establishes relative importance of candidate objects to each other.

r=Discount factor based on time. For example, a business object's transaction last month weighs less than this month by the factor r. Initial value=0.05, for example. This is similar to the discounted cash flow formula.

The monthly (or another period such as a day) Bayesian calculation for each candidate object instance is discussed next. First, the general formula for calculating the Bayesian average is given as:

$$x_{avg} = \frac{K*m + \sum_{i=1 \ldots n} x_i}{K+n}$$

where,

K=estimated total, m=estimated mean, n=number of items for the period for which the average is to be calculated.

K and m can be estimated, or historical data can be used to determine K and m. For example, if over the past year there were q instances for a given candidate object (product), which were used in y transactions of a given business object BO, the median of averages of these instances can be taken to determine m. The estimated mean (m) would be the median of means: (C1/y, C2/y, . . . , Cq/y, where K=y, which is the total number of business transactions).

The second term of the Bayesian equation is a summation of all business transactions for a particular instance of a candidate object. The denominator is the sum of K and n, where n=the number of business transactions for a particular candidate object. The formula for one instance of a candidate object C for the $i^{th}$ period (month, week, day, etc.) is given as:

$$N_{iB_c} = \frac{(K*m + N_c)}{K+N}$$

where, $N_c$=number of business transactions referring to a given instance of a candidate object (C) during the $i^{th}$ period.

N=total number of business transactions for all candidate object (C) instances during the $i^{th}$ period.

FIG. 3 illustrates instances of products, service requests, and knowledge searches to support an example of ordering (arranging) the products according to a popularity of the products as determined by the system 110 of FIG. 1 when implementing the method 200 of FIG. 2, where the popularity of the products is determined based on the service requests and the knowledge searches.

In a service industry, it may be desirable to display the products on a web page or in a list in an order of priority (based on popularity). Popularity can be calculated based on a Bayesian average of the number of service requests (SR) and knowledge searches (KB) for a given product. In this example, Product is the candidate object, Service Request is a Business Object (BO1), and Knowledge Search is another Business Object (BO2). An instance of a candidate object (a product) may be "iphone5", for example, and a business transaction may be an instance of a service request "SR100" or a knowledge search "Search100", for example.

Referring to FIG. 3, table 310 illustrates instances of products (candidate objects) such as iPhones, table 320 illustrates instances of service requests (business objects) associated with the iPhones, and table 330 illustrates instances of knowledge searches (business objects) associated with the iPhones. For a service case, it is assumed that the popularity of a product is based on the number of Service Requests (Tickets) logged, and the number of product searches performed by users. That is, the higher the number of Service Requests created, the more popular the product is considered to be. Also, the higher the number of product searches performed, the more popular the product is considered to be.

The product popularity score ($p_{score}$) for the product may be calculated by transforming the transactional data as follows:

$$p_{score} = \sum_{i=1}^{12} \frac{c1 * N_{i\,SR}}{(1+r)^{(i-1)}} + \sum_{i=1}^{12} \frac{c2 * N_{i\,KB}}{(1+r)^{(i-1)}}$$

where, $N_{i\,SR}$=Bayesian average of SRs for the given product for the $i^{th}$ month as calculated below herein.

$N_{i\,KB}$=Bayesian average of KB searches for the given product for the $i^{th}$ month as calculated below herein.

c1=Constant to indicate the popularity of SR object compared to others such as KB etc. (Initial value=0.6, for example)

c2=Constant to indicate the popularity of KB object compared to others such as SR etc. (Initial value=0.4, for example)

(Note: c1+c2 . . . cn=1)

r=Discount factor based on time. For example, SRs number last month weighs less than this month by the factor r. Initial value=0.05, for example. This is similar to the discounted cash flow formula.

The Bayesian average for a Service Request business object for a given month can be calculated as follows:

$$N_{iSR} = \frac{K * m + T_{SR}}{K + N}$$

where,

K=Estimate or total SRs in the system.

m=Estimate or mean average number of SRs for a product.

$T_{SR}$=Total SRs that reference a given product for the month.

N=Total SRs created during that month.

The Bayesian average for a Search business object for a given month can be calculated as follows:

$$N_{iKB} = \frac{K * m + T_s}{K + N}$$

where,

K=Estimate or total Searches in the system.

m=Estimate or mean average number of Searches for a product.

$T_S$=Total Searches that reference a given product for the month.

N=Total Searches during that month.

In one embodiment, calculations can be further improved by taking into consideration the severity of service requests or the rating of searched knowledge articles, for example.

In this manner, transactional data can be transformed into popularity scores for objects (e.g., products). Bayesian averaging techniques are employed to calculate a popularity score for a particular object. Assumptions can be made by the business enterprise with respect to characteristics of the transactional data that are considered to make an object popular among users.

Computing Device Embodiment

Figure 4:
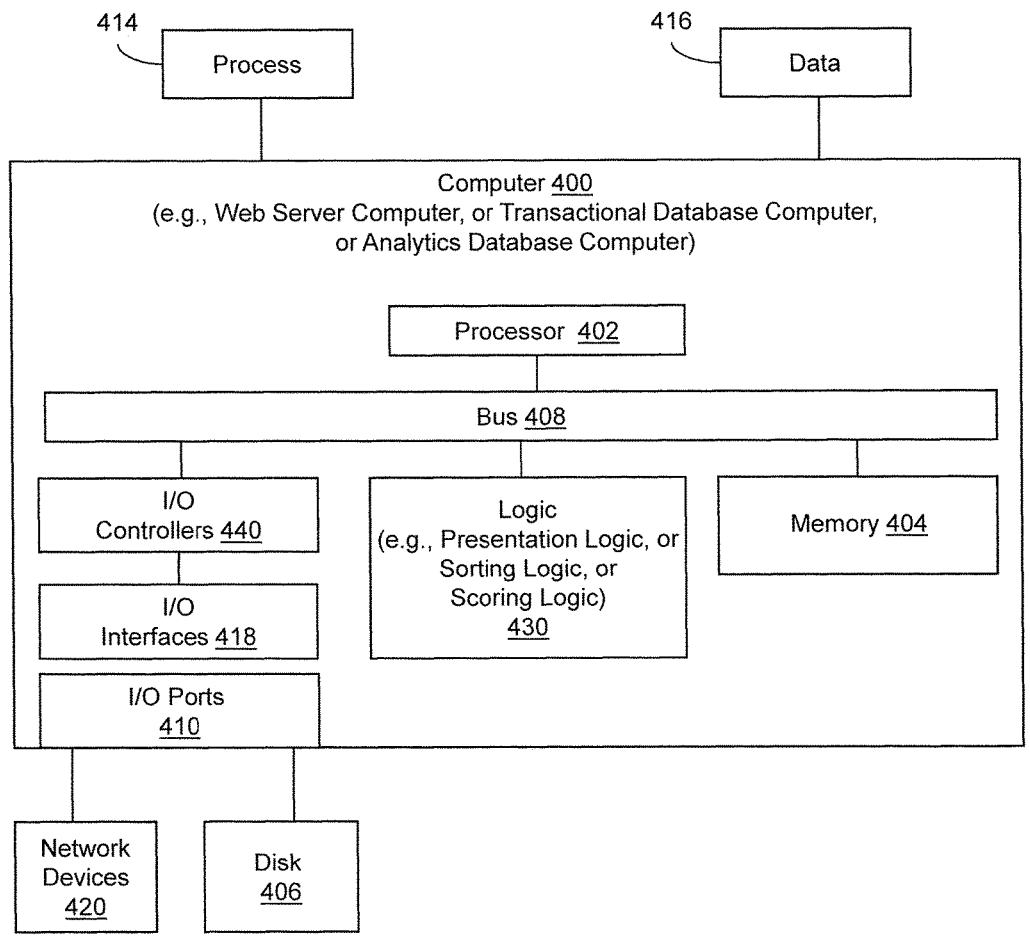
FIG. 4 illustrates an example embodiment of a computing device which can be configured as, for example, a web server computer, a transactional database computer, or an analytics database computer of the computerized web-based customer service system of FIG. 1.

FIG. 4 illustrates an example computing device that is configured and/or programmed with one or more of the example systems and methods described herein, and/or equivalents. FIG. 4 illustrates one example embodiment of a computing device upon which an embodiment of a web server computer having presentation logic, or a transactional database computer having sorting logic, or an analytics database computer having scoring logic may be implemented. The example computing device may be a computer 400 that includes a processor 402, a memory 404, and input/output ports 410 operably connected by a bus 408.

In one example, the computer 400 may be a web server computer that includes logic 430 (e.g. corresponding to presentation logic 114 from FIG. 1). In another example, the computer 400 may be a transactional database computer that includes logic 430 (e.g., corresponding to sorting logic 116 from FIG. 1). In still another example, the computer 400 may be an analytics computer that includes logic 430 (e.g., corresponding to scoring logic 118 from FIG. 1). In different examples, logic 430 may be implemented in hardware, a non-transitory computer-readable medium with stored instructions, firmware, and/or combinations thereof. While logic 430 is illustrated as a hardware component attached to the bus 408, it is to be appreciated that in other embodiments, logic 430 could be implemented in the processor 402, a module stored in memory 404, or a module stored in disk 406.

In one embodiment, logic 430 or the computer 400 is a means (e.g., structure: hardware, non-transitory computer-readable medium, firmware) for performing the actions described. In some embodiments, the computing device may be configured as a server or a database operating in a cloud computing system, a server or a database configured in a Software as a Service (SaaS) architecture, a smart phone, laptop, tablet computing device, and so on.

The means may be implemented, for example, as an ASIC programmed to generate an ordered object presentation, form sorted object data, or generate object popularity scores. The means may also be implemented as stored computer executable instructions that are presented to computer 400 as data 416 that are temporarily stored in memory 404 and then executed by processor 402.

Logic 430 may also provide means (e.g., hardware, non-transitory computer-readable medium that stores executable instructions, firmware) for generating an ordered object presentation, forming sorted object data, or generating object popularity scores.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the i/o interfaces 418, and/or the i/o ports 410. Through the network devices 420, the computer 400 may interact with a network. Through the network, the computer 400 may be logically connected to remote computers. Networks with which the computer 400 may interact include, but are not limited to, a LAN, a WAN, and other networks.

Figure 5:
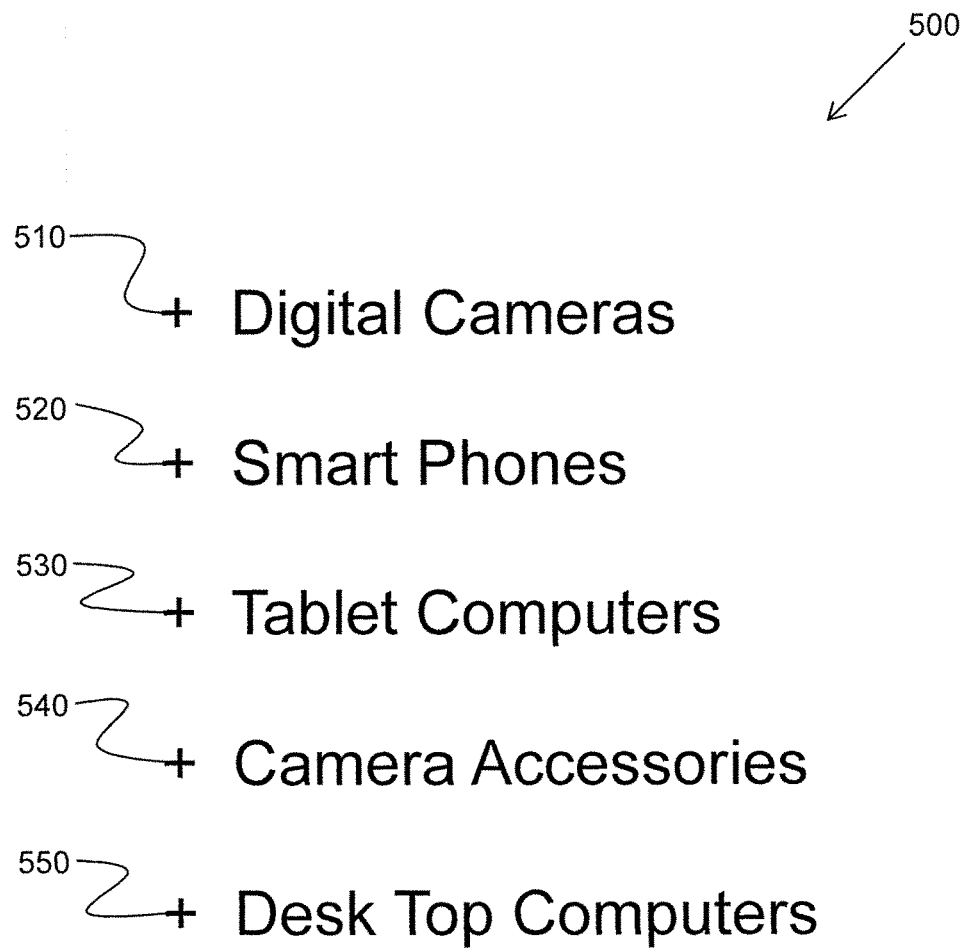
FIG. 5 illustrates a first example embodiment of a representation of an ordered object presentation.

FIG. 5 illustrates a first example embodiment of a representation of an ordered product presentation 500. The ordered product presentation 500 is a list (in the form of a data structure) having the product names (derived from the product identification data) arranged vertically in ranked order from the top of the list to the bottom of the list. The ordered product presentation 500 may be displayed to a user as a list of selectable links, for example. As seen in FIG. 5, the ordered product presentation 500 represents a list of products including digital cameras 510, smart phones 520, tablet computers 530, camera accessories 540, and desk top computers 550.

Figure 6:
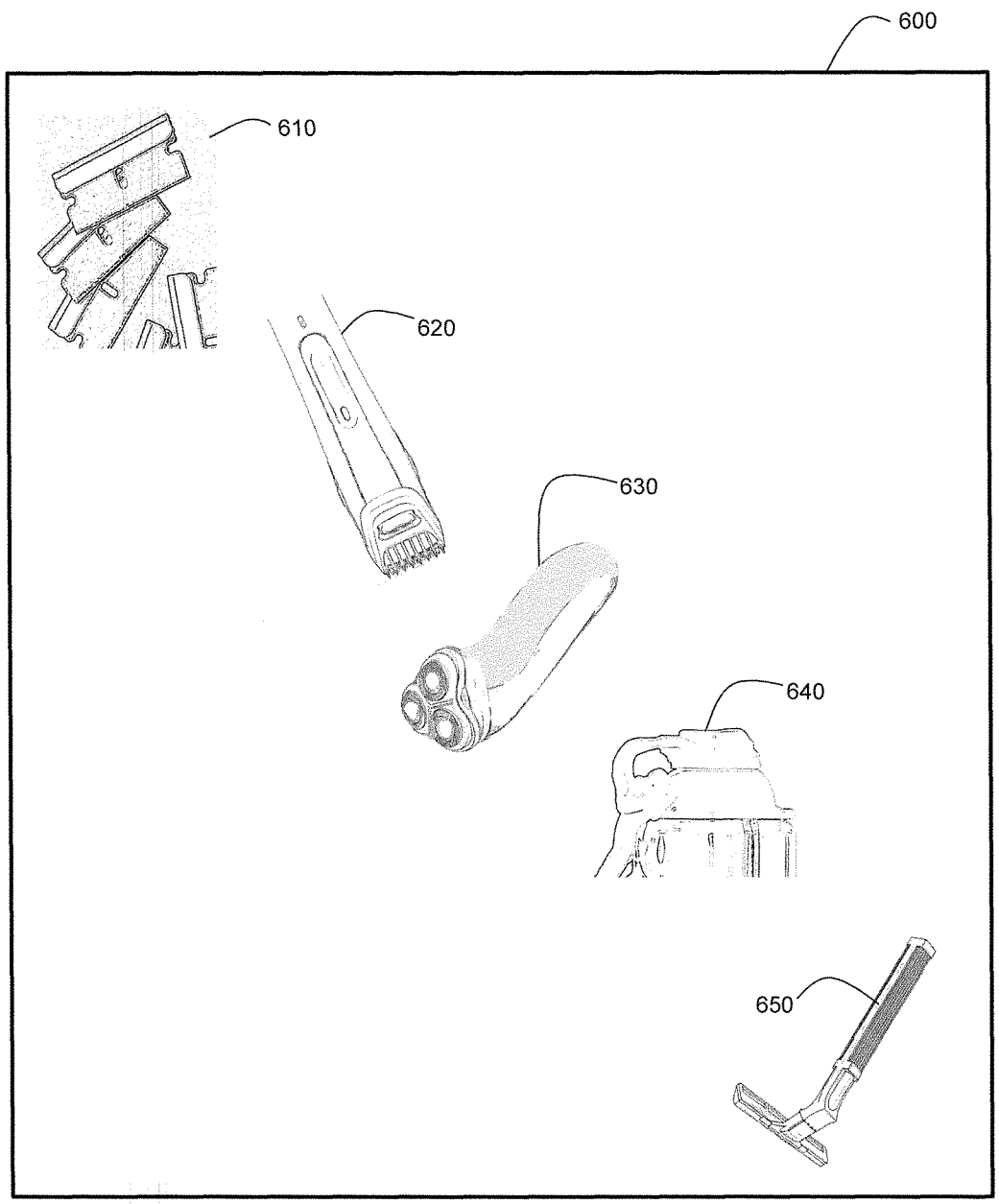
FIG. 6 illustrates a second example embodiment of a representation of an ordered object presentation.

FIG. 6 illustrates a second example embodiment of a representation of an ordered product presentation 600. The ordered product presentation 600 is a web page (in the form of a data structure) having pictures of the products (derived from the product identification data) arranged in ranked order from the upper left side of the web page to the lower right side of the web page. The ordered product presentation 600 may be displayed to a user as a web page of selectable pictures or icons, for example. As seen in FIG. 6, the ordered product presentation 600 represents a web page of products including razor blades 610, beard trimmers 620, electric shavers 630, shaving cream 640, and disposable razors 650.

Figure 7:
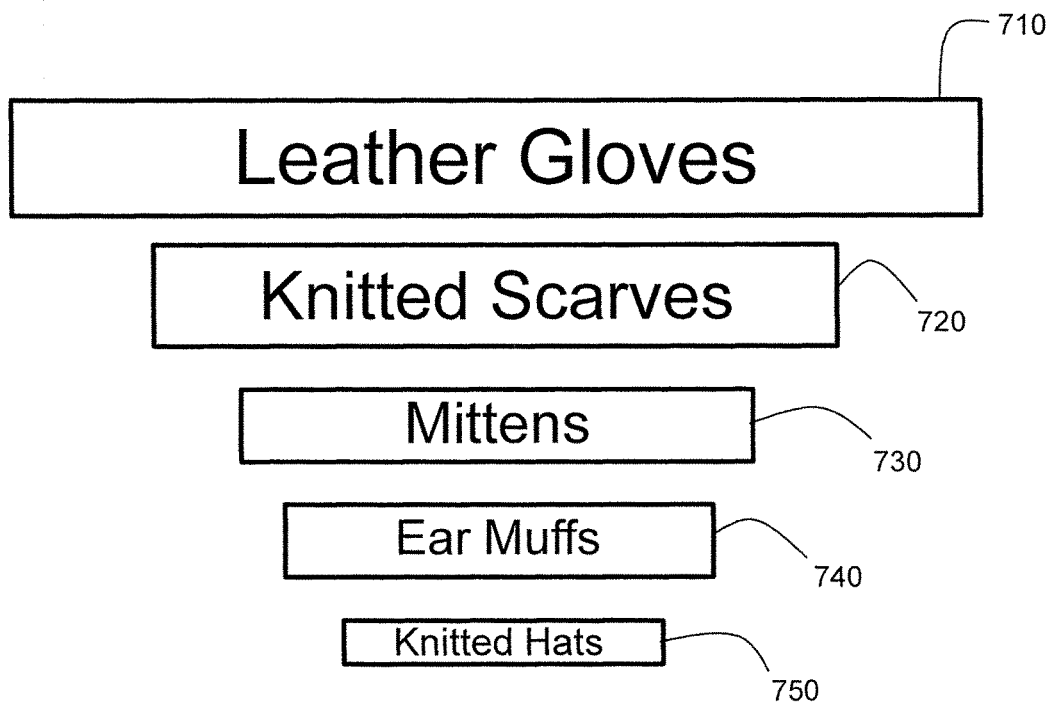
FIG. 7 illustrates a third example embodiment of a representation of an ordered object presentation.

Other arrangements are possible as well, in accordance with other embodiments. As an alternative or in addition, the resultant displayed size of names and/or pictures of products defined in an ordered product presentation may be relatively larger (more popular) or smaller (less popular) depending on ranking. FIG. 7 illustrates a third example embodiment of a representation of an ordered product presentation 700. The ordered product presentation 700 is a list (in the form of a data structure) having the product names (derived from the product identification data) being of different sizes based on rank of the products. The ordered product presentation 700 may be displayed to a user as a list of selectable links of the different sizes, for example. As seen in FIG. 7, the ordered product presentation 700 represents a sized list of products including leather gloves 710, knitted scarves 720, mittens 730, ear muffs 740, and knitted hats 750.

Systems, methods, and other embodiments have been described that are configured to present object representations to a user in an ordered manner based on object popularity. In one embodiment, transactional data is recorded. The transactional data represents objects and associated events caused by interactions of users, via multiple user web browsers, with a website representing multiple objects. The transactional data is transformed into object popularity data that includes object identifying data and associated object popularity scores. The object popularity scores represent a popularity of the objects based on characteristics of the transactional data. The object identifying data of the objects is sorted based on the associated object popularity scores to form sorted object data. An ordered object presentation is generated based on the sorted object data. The ordered object presentation includes a data structure in the form of, for example, a list or a web page providing computerized representations of the objects arranged based on the sorted object data.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computerized web-based customer service system that includes at least one processor for executing instructions from a memory, the method comprising:
recording transactional data, wherein the transactional data represents events caused by interactions of users during a plurality of different time periods, via a plurality of user web browsers, with a website representing a plurality of objects;
transforming the transactional data into object popularity scores for each of the plurality of objects by determining a Bayesian average of the events that occurred during the different time periods for the plurality of objects, and applying a time-based discount factor to the Bayesian average of the events that occurred during each of the plurality of different time periods to assign: (i) a relatively-heavy weight to the Bayesian average of the events for the plurality of objects during a current time period, and (ii) a relatively-light weight to the Bayesian average of the events for the plurality of objects during a previous time period that preceded the current time period, wherein the object popularity scores for the plurality of objects is associated with object identifying data, and the object popularity scores represent a popularity of the plurality of objects based on characteristics of the transactional data recorded for the plurality of different time periods;
sorting the object identifying data of the plurality of objects based on the associated object popularity scores to form sorted object data;
generating an ordered object presentation configured to be displayed by a small form-factor device based on the sorted object data, wherein the ordered object presentation includes a data structure in the form of at least one of a list or a web page providing computerized representations of the plurality of objects arranged based on the sorted object data;
receiving an application interface call from a user web browser of the plurality of user web browsers; and
transmitting the ordered object presentation to the user web browser in response to the application interface call.

2. The method of claim 1, wherein transforming the transactional data comprises determining the object popularity scores based on at least one of: (i) data corresponding to service requests for the objects initiated via the website, and (ii) data relating to articles discussing the objects accessed via the website.

3. The method of claim 1, wherein the transforming of the transactional data occurs at a scheduled time.

4. The method of claim 1, wherein the characteristics of the transactional data include types of the events and a number of each of the types of the events occurring over a selected number of the different time periods.

5. The method of claim 1, wherein the object popularity scores include numerical values represented as computerized data.

6. The method of claim 1, wherein the ordered object presentation is configured to be displayed by the user web browser of the plurality of user web browsers.

7. The method of claim 1, wherein the website represents the plurality of objects via at least one of text, icons, and links configured to be displayed by the plurality of user web browsers.

8. The method of claim 1, wherein each user web browser of the plurality of user web browsers is associated with a separate user computer.

9. The method of claim 1, wherein the recording transactional data is performed over a selected number of the different time periods.

10. The method of claim 1, further comprising updating the ordered object presentation by repeating the recording, the transforming, the sorting, and the generating based on updated transactional data, wherein the updated transactional data includes representations of additional events caused by additional interactions of users, via the plurality of user web browsers, with the website.

11. A computing system, comprising:
a web server computer configured to capture transactional data via an application program interface layer of the web server computer, wherein the transactional data represents events caused by interactions of users during a plurality of different time periods, via a plurality of user web browsers, with a website provided by the web server computer and representing a plurality of objects;
a transactional database computer configured to store the transactional data captured by the web server computer;
an analytics database computer configured to:
extract the transactional data from the transactional database computer,
transform the transactional data into object popularity scores for each of the plurality of objects by determining a Bayesian average of the events that occurred during the different time periods for the plurality of objects, and applying a time-based discount factor to the Bayesian average of the events that occurred during each of the plurality of different time periods to assign: (i) a relatively-heavy weight to the Bayesian average of the events for the plurality of objects during a current time period, and (ii) a relatively-light weight to the Bayesian average of the events for the plurality of objects during a previous time period that preceded the current time period, wherein the object popularity scores for the plurality of objects is associated with object identifying data, and the object popularity scores represent a popularity of the plurality of objects based on characteristics of the transactional data, and
load the object popularity data into the transactional database computer;
the transactional database computer further configured to:
sort the object identifying data of the plurality of objects based on the associated object popularity scores to form sorted object data, and
send the sorted object data to the web server computer; and
the web server computer further configured to:
generate an ordered object presentation configured to be displayed by a small form-factor device based on the sorted object data, wherein the ordered object presentation includes a data structure in the form of at least one of a list or a web page providing computerized representations of the plurality of objects arranged based on the sorted object data,
receive an application interface call from a user web browser of the plurality of user web browsers via the application interface layer, and
transmit the ordered object presentation to the user web browser, via the application interface layer, in response to the application interface call.

12. The computing system of claim 11, wherein the analytics database computer is configured to transform the transactional data based on at least one of: (i) data corresponding to service requests for the objects initiated via the website, and (ii) data relating to articles discussing the objects accessed via the website.

13. The computing system of claim 11, wherein the analytics database computer is configured to extract the transactional data from the transactional database computer at a scheduled time.

14. The computing system of claim 11, wherein the web server computer includes a presentation module stored in a memory including instructions that when executed cause a processor of the web server computer to generate the ordered object presentation based on the sorted object data.

15. The computing system of claim 11, wherein the computing system is a computerized web-based customer service system configured to communicate with the plurality of web browsers via the internet.

16. A non-transitory computer-readable medium storing instructions that when executed by one or more processors of a computing system, cause the computing system to at least:
  record transactional data, wherein the transactional data represents events caused by interactions of users during a plurality of different time periods, via a plurality of user web browsers, with a website representing a plurality of objects;
  transform the transactional data into object popularity scores for each of the plurality of objects by determining a Bayesian average of the events that occurred during the different time periods for the plurality of objects, and applying a time-based discount factor to the Bayesian average of the events that occurred during each of the plurality of different time periods to assign: (i) a relatively-heavy weight to the Bayesian average of the events for the plurality of objects during a current time period, and (ii) a relatively-light weight to the Bayesian average of the events for the plurality of objects during a previous time period that preceded the current time period, wherein the object popularity scores for the plurality of objects is associated with object identifying data, and the object popularity scores represent a popularity of the plurality of objects based on characteristics of the transactional data recorded for the plurality of different time periods;
  sort the object identifying data of the plurality of objects based on the associated object popularity scores to form sorted object data;
  generate an ordered object presentation configured to be displayed by a small form-factor device based on the sorted object data, wherein the ordered object presentation includes a data structure in the form of at least one of a list or a web page providing computerized representations of the plurality of objects arranged based on the sorted object data.

17. The non-transitory computer-readable medium of claim 16, wherein the instructions further comprise instructions that when executed by the one or more processors cause the computing system to:
  receive an application interface call from a user web browser of the plurality of user web browsers; and
  transmit the ordered object presentation to the user web browser in response to the application interface call.

18. The non-transitory computer-readable medium of claim 16, wherein the instructions further comprise instructions that when executed by the one or more processors cause the computing device to update the ordered object presentation by repeating the record, the transform, the sort, and the generate steps of claim 16 based on updated transactional data, wherein the updated transactional data includes representations of additional events caused by additional interactions of users, via the plurality of user web browsers, with the website.

* * * * *